G. E. STONE.
SPRAYING NOZZLE.
APPLICATION FILED APR. 8, 1912.

1,070,076.

Patented Aug. 12, 1913.

WITNESSES:
A. C. Fairbanks.
J. M. Davenport.

INVENTOR.
George E. Stone,
BY
Webster & Co.
ATTORNEYS.

_BEST AVAILABLE COPY_

UNITED STATES PATENT OFFICE.

GEORGE E. STONE, OF AMHERST, MASSACHUSETTS.

SPRAYING-NOZZLE.

1,070,076. Specification of Letters Patent. Patented Aug. 12, 1913.

Application filed April 8, 1912. Serial No. 689,176.

*To all whom it may concern:*

Be it known that I, GEORGE E. STONE, a citizen of the United States of America, residing at Amherst, in the county of Hampshire and State of Massachusetts, have invented a new and useful Spraying-Nozzle, of which the following is a specification.

My invention relates to improvements in devices designed to be attached to the delivery ends of conduits for spraying purposes, being particularly adapted for use in connection with machines for delivering, distributing or dispersing germicides, disinfectants, deodorizers and the like in liquid form, although applicable as well to conduits, such as hose, that are connected with any source of liquid supply, and consists of an open-ended casing or receptacle having an inlet and provided with an interior atomizing and deflecting member which is adjustable over a path that includes said inlet, such path preferably being an arc of a circle that is bisected by a continuation of the axis of said inlet, such axis and continuation being at right-angles to the plane upon which such arc is described, together with means for adjusting said atomizing and deflecting member, all being of peculiar construction and as hereinafter more fully set forth.

In the art of spraying and especially spraying trees or even large areas of plants it is desirable that the liquid be thrown as far as possible from the delivery end of the source of supply and at the same time be widely disseminated, also that means be provided for easily and quickly changing the course or more correctly speaking perhaps the shape of the stream of spray, and the primary object of my invention is to produce a simple, inexpensive and convenient discharge nozzle with which these desired ends are attained. Owing to the peculiar construction of my nozzle the same is capable of breaking up a stream and converting it into a wide area of spray without cutting down the range of the same to an extent that would cause said spray to fall short of the top of the tallest tree which it is customary to treat with certain prepared liquids, consequently said nozzle is an exceedingly good tree atomizer.

A further object is to provide such a spraying nozzle with adjustable means for deflecting and otherwise controlling the stream which passes through the atomizing device.

These and other objects and advantages which will appear in the course of the following description I attain and secure by the means illustrated in the accompanying drawings, in which—

Figure 1:
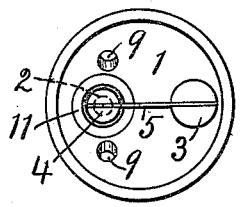
Figure 2:
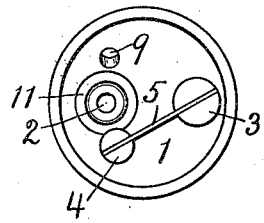
Figure 3:
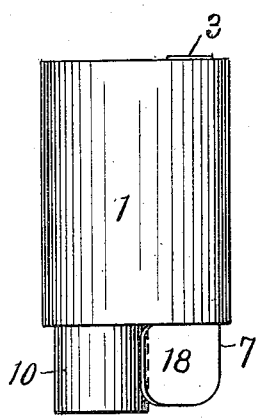
Figure 4:
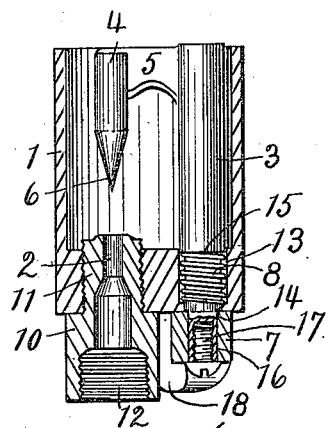
Figure 5:
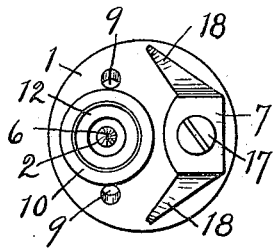
Figure 6:
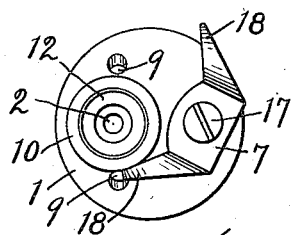
Figure 7:
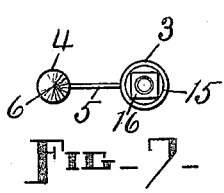

Figure 1 is a top plan of a practical form of my spraying nozzle, the combined atomizing and deflecting member being disposed so as to produce the maximum amount of spray; Fig. 2, a similar plan showing said member disposed in one of two extreme positions whereby the stream is least affected and but little spray is produced; Fig. 3, a side elevation of said nozzle; Fig. 4, a central vertical section through said nozzle; Fig. 5, a bottom plan of said nozzle, the movable parts in this and in the two preceding views being disposed as in the first view; Fig. 6, a bottom plan showing the movable parts disposed as in Fig. 2, and, Fig. 7, a bottom plan of the atomizing and deflecting members detached.

Similar figures refer to similar parts throughout the several views.

Although I have shown and will describe in detail a practical embodiment of my invention, it is to be understood that the same is susceptible of being variously modified and changed, not only in shape and size, but also in the arrangement and construction of some or all of the parts.

Referring to the drawings it will be observed that the device as therein presented comprises a hollow cylindrical casing or cup 1 which is open at the top and has an inlet 2 at the bottom; an atomizer and stream deflector or a combined atomizing and deflecting element having a part suspended over and adapted to be moved over an arc of a circle that passes through the center of said inlet, but arranged with the plane of its radii at right-angles to the axis of said inlet, such element consisting of a rotatable post 3 mounted in the floor of said cup, a short pendent post 4 parallel with said first-mentioned post, and a thin web 5 which connects said posts at their upper terminals; means for partially rotating said post 3 to locate said post 4 at different points in the arc which it is capable of describing, and means to retain said post 3 with said post 4 at whatever point the short or pendent post may be located by the long post. The pendent post 4 is the atomizing and deflecting member proper, it is situated within the cup 1, and the lower terminal of said post is preferably sharp or pointed as shown at 6. The rotating means for the post 3 is a winged block 7 fastened to the base of said post, and a spring 8 is employed as the holding means for said post. In the bottom of the cup 1 are drip or drainage openings 9, there being two in the present case.

The steam enters the cup 1 through a nipple or coupling 10 that is tapped into the bottom of said cup at 11, the passage through said coupling constituting the inlet 2. The lower protruding portion of the coupling 10 is internally screw-threaded at 12 to afford means for connecting said coupling with a supply conduit or pipe (not shown), and by furnishing a number of couplings having threaded parts 12 of different sizes, my device can be fitted to various sizes of supply pipes by simply changing the coupling when necessary and as required to actuate the same to any given size of pipe. No variation in the size of the part 11 of the coupling 10 that is screwed into the cup 1 is needed, the universal feature being obtained by varying the size of the part 12 only.

The post 3 is received in an opening 13 in the bottom of the cup 1, and this opening is constricted at the bottom by an annular flange 14. That portion of the post 3 that is in the opening 13 is smaller than the major portion of said post which is above the cup floor, so that a shoulder 15 is formed on said post about on a level with the upper surface of said floor, and the spring 8 encircles the post between said shoulder and the flange 14, said spring thus being in said opening.

The centers of the inlet 2 and the opening 13 are on a diameter of the cup 1, and, since the post 3 is set in said opening and supports the post 4 over said inlet or over an arc struck with the axis of said opening as a center and cutting the center of said inlet, the parts and members being proportioned and arranged to this end as previously explained, said post 3 can be swung as far to one side of said inlet as it can to the other side thereof.

The post 3 has a base 16 which extends below the cup bottom, such base or extension being angular in cross-section, and the block 7 has a central opening shaped to receive said extension. A screw 17 is tapped into the extension 16 from below to retain the block 7 in place, the head of said screw being large enough to support said block. When the parts are assembled and the screw 17 is tightened the spring 8 is compressed and produces an amount of frictional resistance that is sufficient to hold the rotary parts in whatever position they may be left after adjustment, even against any lateral force which the flowing liquid exerts on the post 4 and the web 5, the greater amount of such resistance being engendered between the contacting surface portions of the cup bottom and block. To a clear understanding of this attention is called to the fact that, while the screw 17 holds the block 7 to the post extension 16, the spring 8 tends constantly to force the post 3 upwardly and press said block against the cup bottom, because said spring rests on the fixed flange 14 and bears against the shoulder 15 on the post which would be movable in an upward direction in the absence of a retaining medium such as said block and screw.

To facilitate turning the block 7 with the post 3 and at the same time limit the movement of the parts said block is provided at the ends with inwardly-extending but relatively divergent wings 18—18. These wings afford convenient means for receiving pressure from the thumb and fingers to actuate the rotary parts, and they are so constructed and positioned that they contact with the sides of the protruding portion of the coupling 10 when said block is actuated and limit the movement of said parts in both directions, thus preventing the pendent post 4 from striking against the sides of the cup 1 and so possibly bending or breaking the web 5 which is quite thin as previously noted. Owing to the presence of the spring 8 some little force must be exerted in order to overcome the resistance of the frictionally-engaged members, and without the stop afforded by the coupling 10 and the wings 18 the web 5 would have to withstand such force at the end of the rotative action unless great care were exercised. In making a partial turn of the block both wings 18 are usually grasped and some care is required in order to get the desired result, so that the operation is performed without liability of sudden shock and no check is needed.

In practice, when the pendent post 4 is positioned directly in line with the inlet 2, as in Figs. 1, 3, 4 and 5, the stream entering the cup 1 at said inlet is split up uniformly and scattered over its maximum area, the thin web 5 having very little effect on the spreading of the liquid. Since the stream enters the cup 1 under pressure through the comparatively small inlet 2, and is then permitted to expand although subject to a certain measure of confinement in the larger space within said cup while being driven past the post 4 which pierces with its point 6 the center of said stream, the latter in the form of finely atomized and widely disseminated spray is projected a greater distance beyond the open end of the cup, although not so far as would be the case if the stream were unobstructed. To deflect the stream to either side, the post 4 is thrown, through the medium of the block 7 and intervening parts, in the direction which it is desired the stream shall take. The post 4 is thus positioned at one side or the other of the center of the stream and so causes the stream to be atomized more on one side than on the other, with the result that deflection takes place and the range is increased.

The greater the distance the post 4 is from the center of the stream the smaller the amount of spray produced, and the longer the range. When the post 4 is swung into either of its extreme lateral positions, an example of which appears in Figs. 2 and 6, the maximum range of the stream is attained and the minimum amount of spray is produced, under a given pressure, because then the stream only grazes as it were said post, and the degree of deflection is not so great as when said post is at some point between the center of the stream and such extreme lateral position, in fact such degree of deflection may be quite negligible in some cases and under some conditions.

The success of this nozzle is largely dependent on the position of the pendent post, such post being within the cup, because it is necessary to pierce the stream while confined in the cup—to pierce it after leaving the cup would result in unduly cutting down the range and render altogether too unstable and uncertain the spray column.

The openings 9 in the floor of the cup 1 are simply for the purpose of permitting any liquid that drops into said cup to escape, so that the cup under ordinary conditions can not become filled with such drippings. Preferably the openings 9 are situated on opposite sides of and adjacent to the coupling 10, and diverge or incline away from said coupling, from top to bottom, whereby the drip is conducted away from the coupling and prevented from running down the same and down the pipe to which the coupling may be attached.

What I claim as my invention, and desire to secure by Letters Patent, is—

1. A spraying nozzle comprising a hollow receptacle having an inlet at one end and open at the other end, a post mounted to rotate in said receptacle parallel with said inlet, a substantially flat web extending laterally from said post, and a cylindrical pendent member in said receptacle attached to said web at the end opposite that which is attached to said post, said pendent member being parallel with said post and carried over a path that includes said inlet.

2. A spraying nozzle comprising a hollow receptacle having an inlet at one end and open at the other end, a post mounted to rotate in said receptacle parallel with said inlet, a substantially flat web extending laterally from said post, and a cylindrical pendent member in said receptacle attached to said web at the end opposite that which is attached to said post, said pendent member having a pointed inner terminal and being arranged parallel with said post and carried over a path that includes said inlet.

3. A spraying nozzle comprising a hollow receptacle having an inlet at one end and open at the other end, an adjustable pendent member mounted in said receptacle and adapted to be moved over an arc of a circle that passes through the center of said inlet, the plane of the radii of such arc being at right-angles to the axis of said inlet, and means exterior to said receptacle for operating said pendent member.

4. A spraying nozzle comprising a hollow receptacle having an inlet at one end and open at the other end, an adjustable pendent member mounted in said receptacle and adapted to be moved over an arc of a circle that passes through the center of said inlet, the plane of the radii of such arc being at right-angles to the axis of said inlet, means exterior to said receptacle for operating said pendent member, and means to retain said pendent member in position after adjustment.

5. The combination, in a spraying nozzle, with a cup provided with an inlet coupling in the bottom and open at the top, of a post mounted to rotate in said cup and provided with an atomizing and deflecting member which is carried by said post over a path that includes the inlet, and a winged block fixed to the base of said post below said cup to actuate the post and limit the movement thereof, said coupling extending into the paths of the wings of said block.

6. The combination, in a spraying nozzle, with a cup having an inlet and a flanged opening in the bottom and open at the top, of a shouldered post mounted in said opening and provided with an atomizing and deflecting member which is carried by said post over a path that includes said inlet, a spring in said opening between the flange therein and the post shoulder, a block, and means to secure said block to the base of said post and to retain said spring under compression.

7. The combination, in a spraying nozzle, with a cup provided with a removable inlet coupling in the bottom and open at the top, of a post mounted parallel with the axis of said coupling to rotate in said cup and provided with an atomizing and deflecting member which is parallel with and carried by said post over a path that includes the inlet, and means outside of said cup for turning said post.

8. The combination, in a spraying nozzle, with a cup having an inlet and a drip opening in the bottom and open at the top, of a post mounted parallel with the axis of said inlet to rotate in said cup and provided with an atomizing and deflecting member parallel with said post and carried by the latter over a path that includes said inlet, and means outside of said cup for turning said post.

GEORGE E. STONE.

Witnesses:
F. A. CUTTER,
A. C. FAIRBANKS.

Copies of this patent may be obtained for five cents each, by addressing the "Commissioner of Patents, Washington, D. C."